United States Patent
Schneider et al.

(10) Patent No.: US 9,459,727 B2
(45) Date of Patent: *Oct. 4, 2016

(54) SYNCHRONIZATION OF SENSOR MODULES ON A COMPUTING DEVICE

(71) Applicant: GOOGLE INC., Mountain View, CA (US)

(72) Inventors: David Ness Schneider, Sunnyvale, CA (US); Matthew Dominic Tenuta, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/709,111

(22) Filed: May 11, 2015

(65) Prior Publication Data

US 2015/0301680 A1 Oct. 22, 2015

Related U.S. Application Data

(62) Division of application No. 14/258,401, filed on Apr. 22, 2014, now Pat. No. 9,058,079.

(51) Int. Cl.
*G06F 3/041* (2006.01)
*G06F 3/044* (2006.01)
*H04B 5/00* (2006.01)

(52) U.S. Cl.
CPC ............ *G06F 3/0416* (2013.01); *G06F 3/044* (2013.01); *G06F 3/0418* (2013.01); *H04B 5/0012* (2013.01); *H04B 5/0031* (2013.01); *G06F 2203/04106* (2013.01)

(58) Field of Classification Search
CPC .... G06F 3/0416; G06F 3/044; G06F 3/0418; G06F 2203/04106
See application file for complete search history.

(56) References Cited

U.S. PATENT DOCUMENTS

| | | |
|---|---|---|
| 5,801,970 A | 9/1998 | Rowland et al. |
| 6,917,850 B2 | 7/2005 | Kamishio |
| 7,203,517 B2 | 4/2007 | Shimoda et al. |
| 7,479,943 B1 | 1/2009 | Lunsford et al. |
| 7,793,316 B2 | 9/2010 | Mears et al. |

(Continued)

FOREIGN PATENT DOCUMENTS

| | | |
|---|---|---|
| EP | 2169924 B1 | 9/2011 |
| WO | 2013/154552 A1 | 10/2013 |
| WO | 2015/164033 A1 | 10/2015 |

OTHER PUBLICATIONS

Restriction Requirement for U.S. Appl. No. 14/258,401, mailed on Aug. 15, 2014, 5 pages.

(Continued)

*Primary Examiner* — Liliana Cerullo
(74) *Attorney, Agent, or Firm* — Brake Hughes Bellermann LLP

(57) ABSTRACT

A computing device may include a sensor controller configured to control operations of a human-touch capacitive sensor module, a near-field communication (NFC) controller configured to control operations of an NFC module, and/or a plurality of communication lines including a first communication line and a second communication line. Each of the first and second communication lines may be connected to the sensor controller and the NFC controller such that control signals are transferred between the sensor controller and the NFC controller to synchronize the operations of the human-touch capacitive sensor module and the operations of the NFC module.

12 Claims, 5 Drawing Sheets

(56) References Cited

U.S. PATENT DOCUMENTS

| | | |
|---|---|---|
| 7,940,206 B2 | 5/2011 | Nohara et al. |
| 8,555,363 B2 | 10/2013 | Lo et al. |
| 9,058,079 B1 | 6/2015 | Schneider et al. |
| 2004/0157624 A1 | 8/2004 | Hrastar |
| 2006/0175753 A1 | 8/2006 | MacIver et al. |
| 2008/0125103 A1 | 5/2008 | Mock |
| 2009/0006522 A1 | 1/2009 | Kim et al. |
| 2009/0327478 A1 | 12/2009 | Krause et al. |
| 2010/0081406 A1 | 4/2010 | Tan et al. |
| 2010/0145479 A1 | 6/2010 | Griffiths |
| 2010/0199197 A1 | 8/2010 | Faletski et al. |
| 2010/0255856 A1 | 10/2010 | Kansal et al. |
| 2011/0131506 A1 | 6/2011 | Calissendorff |
| 2011/0215966 A1 | 9/2011 | Kim et al. |
| 2013/0005242 A1 | 1/2013 | Royston |
| 2013/0241864 A1 | 9/2013 | Chen et al. |
| 2014/0035378 A1 | 2/2014 | Kesler et al. |
| 2014/0145982 A1 | 5/2014 | Peng et al. |

OTHER PUBLICATIONS

Non-Final Office Action for U.S. Appl. No. 14/258,401, mailed on Oct. 23, 2014, 20 pages.
Notice of Allowance for U.S. Appl. No. 14/258,401, mailed on Feb. 13, 2015, 7 pages.

SYNCHRONIZATION OF SENSOR MODULES ON A COMPUTING DEVICE

CROSS REFERENCE TO RELATED APPLICATION

This application is a Divisional of, and claims priority to, U.S. patent application Ser. No. 14/258,401, filed on Apr. 22, 2014, entitled "SYNCHRONIZATION OF SENSOR MODULES ON A COMPUTING DEVICE", the disclosure of which is incorporated by reference herein in its entirety.

TECHNICAL FIELD

This description relates to the synchronization of modules on a computing device such as near-field communication (NFC) and input sensing.

BACKGROUND

Providing a good experience for both near-field communication (NFC) and human-touch capacitive sensing is relatively challenging, especially when the active areas of NFC and human-touch capacitive sensing overlap. In one specific example, an NFC device may be proximate to (or integrated with) a capacitive sensing device (e.g., trackpad) on a computer. However, the co-existence of these devices may introduce noise and/or block the NFC signal when driving the capacitive elements of the capacitive sensing device. Some conventional approaches physically separate the NFC device from the capacitive sensitive device such that they are disposed on separate areas of the computer. However, these conventional approaches are not necessarily aesthetically acceptable or particularly intuitive.

Other conventional approaches integrated these devices within a single unified interaction point, but provide a user interface to switch from touch mode to NFC listening mode for a certain period of time. However, these conventional approaches are not necessarily beneficial from a user experience point of view. Furthermore, enabling the co-existence of these devices while providing interactivity that is acceptable at a human level is relatively difficult, considering users can detect tens of milliseconds of latency in touch capacitive sensing and expect an NFC response usually within a second.

SUMMARY

The details of one or more implementations are set forth in the accompanying drawings and the description below. Other features will be apparent from the description and drawings, and from the claims.

In a general embodiment, a computing device may include a sensor controller configured to control operations of a human-touch capacitive sensor module, a near-field communication (NFC) controller configured to control operations of an NFC module, and/or a plurality of communication lines including a first communication line and a second communication line. Each of the first and second communication lines may be connected to the sensor controller and the NFC controller such that control signals are transferred between the sensor controller and the NFC controller to synchronize the operations of the human-touch capacitive sensor module and the operations of the NFC module. The sensor controller may be configured to assert an active sensor control signal on the first communication line and control the human-touch capacitive sensor module to start a sensor scan if an active NFC control signal is not asserted by the NFC controller on the second communication line. The NFC controller may be configured to assert the active NFC control signal on the second communication line and control the NFC module to start an NFC scan if the active sensor control signal is not asserted by the sensor controller on the first communication line.

In some embodiments, the computing device may include one or more of the following features or a combination of the following features. The sensor controller may be configured to control the human-touch capacitive sensor module to delay the sensor scan until the sensor controller does not detect the active NFC control signal on the second communication line when the active NFC control signal is asserted on the second communication line. The NFC controller may be configured to de-assert the active NFC control signal after the operations of the NFC module are completed. The sensor controller may be configured to de-assert the active sensor control signal after the operations of the human-touch capacitive sensor module are completed. The sensor controller may include a sensor internal timer configured to determine a timing of the sensor scan. The NFC controller may include an NFC internal timer configured to determining a timing of the NFC scan. An active area of the human-touch capacitive sensor module may at least partially overlap with an active area of the NFC module such that a portion of the computing device functions as an interaction point for both the human-touch capacitive sensor module and the NFC module. The human-touch capacitive sensor module may include a trackpad. Each of the NFC controller and the sensor controller may include an activity output unit configured to output an active control signal, and an allowability input unit configured to receive a non-allowability control signal. The activity output unit of the sensor controller may be connected to the allowability input unit of the NFC controller via the first communication line. The activity output unit of the NFC controller may be connected to the allowability input unit of the sensor controller via the second communication line.

In a general embodiment, a computing device may include a sensor controller configured to control operations of a human-touch capacitive sensor module. The operations of the human-touch capacitive sensor module may include a sensor scan. The computing device may include a near-field communication (NFC) controller configured to control operations of an NFC module. The operations of the NFC module may include an NFC scan. The computing device may include a first communication line and a second communication line. Each of the first and second communication lines may be connected to the sensor controller and the NFC controller. The sensor controller may be configured to output an active sensor control signal on the first communication line and control the human-touch capacitive sensor module to start the sensor scan if a non-allowability control signal is not detected by the sensor controller via the second communication line. The NFC controller may be configured to output an active NFC control signal on the second communication line and control the NFC module to start the NFC scan if a non-allowability control signal is not detected by the NFC controller via the first communication line.

In some embodiments, the computing device may include one or more of the following features or a combination of the following features. If the non-allowability control signal is detected via the second communication line, the sensor controller may be configured control the human-touch capacitive sensor module to delay the sensor scan until the non-allowability control signal is de-asserted on the second communication line. The NFC controller may be configured to de-assert the active NFC control signal after the operations of the NFC module are completed, and the sensor controller may be configured to de-assert the active sensor control signal after the operations of the human-touch capacitive sensor module are completed. The sensor controller may include a sensor internal timer configured to determine a timing of the sensor scan, and the NFC controller may include an NFC internal timer configured to determining a timing of the NFC scan. An active area of the human-touch capacitive sensor module may at least partially overlap with an active area of the NFC module such that a portion of the computing device functions as an interaction point for both the human-touch capacitive sensor module and the NFC module. The human-touch capacitive sensor module may include a trackpad.

In a general embodiment, a method for synchronizing operations of a sensing modules on a computing device may include determining, by a first controller configured to control a first module, whether a non-allowability control signal is detected via a first communication line connected between the first controller and a second controller configured to control a second module, delaying, by the first controller, a scan operation associated with the first module if the non-allowability control signal is detected on the first communication line, asserting, by the first controller, an active control signal via a second communication line connected between the first controller and the second controller if the non-allowability control signal is not detected on the first communication line, and performing, by the first module, the scan operation such that the active control signal is asserted by the first controller until operations of the first module are completed.

In some embodiments, the method may include one or more of the following features or a combination of the following features. The first controller may include a sensor controller, the first module may include a human-touch capacitive sensor module, the second controller may include an NFC controller, and the second module may include an NFC module. The first controller may include an NFC controller, the first module may include an NFC module, the second controller may include a sensor controller, and the second module may include a human-touch capacitive sensor module. The method may include determining, by the first controller, whether a start scan signal is detected. The first controller may determine whether the non-allowability control signal is asserted if the start scan signal is determined as detected. The method may include disregarding the non-allowability control signal if the first module is currently active.

DETAILED DESCRIPTION

Figure 1:
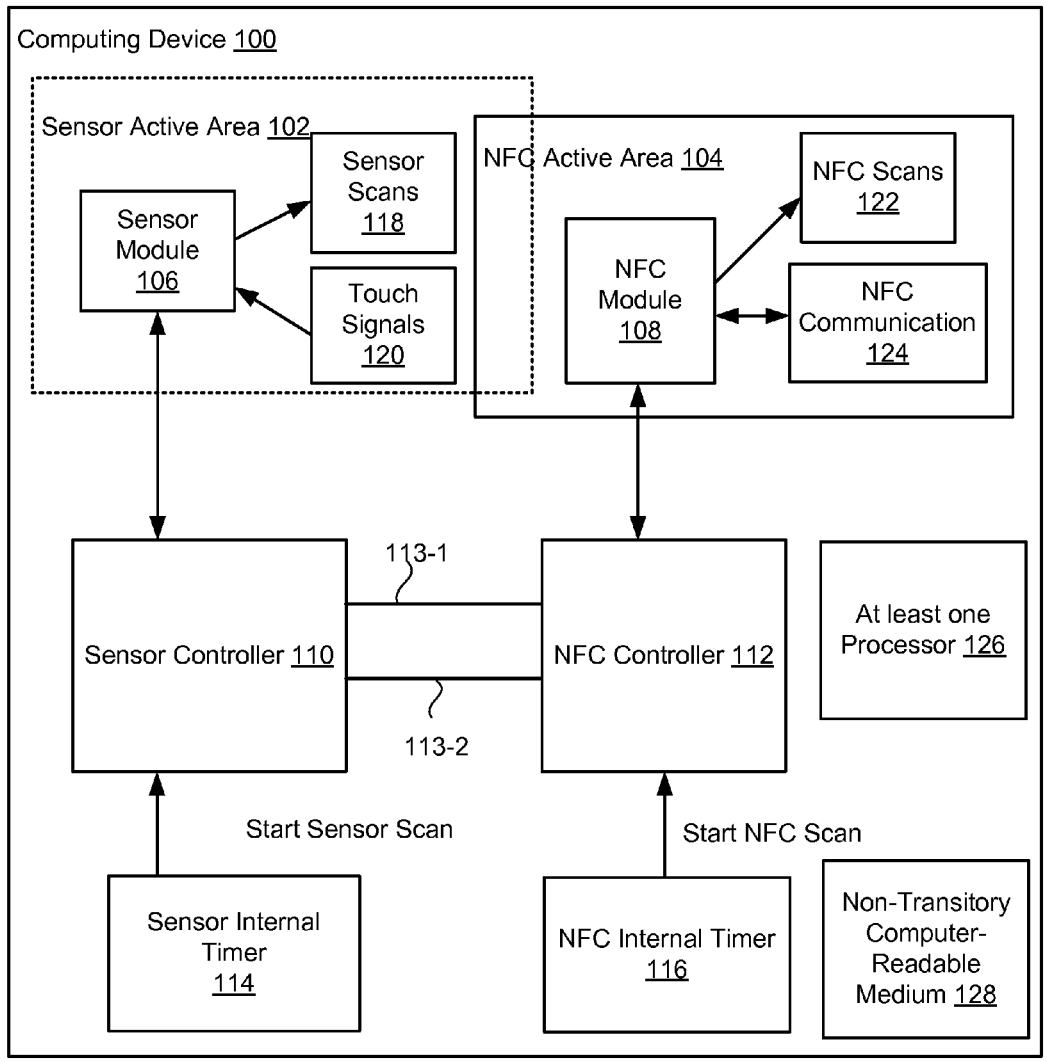
FIG. 1 illustrates a computing device for synchronizing operations of a sensor module with operations of a NFC module using a two-wire synchronization protocol between a sensor controller and an NFC controller according to an embodiment.

This disclosure provides devices and methods for enabling synchronization between an NFC module and a sensor module such that any potential interference can be reduced or substantially eliminated to a level that does not impact a user in a noticeable way. In some examples, a sensor controller may be connected to an NFC controller via a two-wire synchronization protocol such that wireless activities associated with the NFC module are performed substantially at a different time interval than sensing activities associated with the sensor module in a manner that substantially reduces the frequency of collision (and if they happen to collide, the effects are not entirely noticeable to the user). In some examples, the synchronization protocol may not require acknowledgement messages (e.g., when the controller claims use of its module). As such, the synchronization protocol may allow some rare collisions (e.g., when both modules are active), however any resulting interference may be negligible and/or not may be perceived by the user of the computing device.

In some examples, the sensor controller and the NFC controller may be connected to each other such that control signals may be communicated between the sensor controller and the NFC controller according to a synchronization protocol in order to synchronize their respective scanning operations. In some examples, the sensor controller and the NFC controller may be connected to each other via two communication lines configured to transfer control signals. For example, the sensor controller may be configured to output an active sensor control signal via a first communication line (e.g., drive a signal high or low on the first communication line) when the sensor controller is allowed to start a sensor scanning operation (and continue to drive the active sensor control signal during the sensor operations), and the NFC controller may receive and identify the sensor controller's active signal control signal as an indicator to potentially delay an NFC scan. Similarly, the NFC controller may be configured to output an active NFC control signal via a second communication line when the NFC controller is allowed to start an NFC scan (and continue to drive the NFC's active control signal during NFC operations), and the sensor controller may receive and identify the NFC controller's active NFC control signal as an indicator to potentially delay the sensor's scanning operation.

In particular, when the sensor controller outputs its active sensor control signal to the NFC controller via the first communication line, the NFC controller may receive and identify the sensor controller's active sensor control signal as a non-allowability control signal. Similarly, when the NFC controller outputs its active NFC control signal to the sensor controller via the second communication line, the sensor controller may receive and identify the NFC controller's active NFC control signal as a non-allowability control signal. Stated another way, each controller may be configured to output an active control signal via one communication line (when it is permitted and active), and then de-assert the active control signal when its corresponding module ceases being active. However, the assertion of the active control signal is controlled (in part) by the assertion of the non-allowability control signal via the other communication line (when the other controller is active). In this context, each controller may include an activity output unit and an allowability input unit, and these units may be considered cross-connected (e.g., sensor's activity output unit is connected with NFC's allowability input unit via one communication line and the NFC's activity output unit is connected with the sensor's allowability input unit via another communication line).

As such, the operations of the sensor module and the NFC module may be synchronized such that NFC operations are performed substantially at a different time interval than sensing operations in a manner that substantially reduces the frequency of collision (and if they happen to collide, the effects are not entirely noticeable to the user). In addition, in some examples, the synchronization protocol may allow each module's full bandwidth to carry out its operations. For example, the sensing controller may continuously assert its active control signal (thereby producing a non-allowability control signal for the NFC controller) until the sensor module's operations are completed (e.g., until sensor scan is completed or until it has sensed that the user's finger has left the surface, whichever is later). Similarly, the NFC controller may continuously assert its active control signal (thereby producing a non-allowability control signal for the sensor controller) until the NFC module's operations are completed (e.g., until the NFC scan is completed or until the NFC communication is completed, whichever is later).

In some examples, the synchronization protocol may take advantage of each controller's internal timing such that external logic is avoided for implementing this synchronization protocol. For example, the scanning operations of the NFC module may be determined according to an NFC internal timer associated with the NFC controller, and the scanning operations of the sensor module may be determined according to a sensor internal timer associated with the sensor controller. Each internal timer may indicate when to perform a respective scanning operation. As such, if the NFC controller or the sensor controller has a relatively low power policy (e.g., scans less frequency), the synchronization protocol will not force either the sensor module or the NFC module to perform a scanning operation at a different/additional time than what originally provided by its internal timer. These and other features are further explained with reference to the figures.

FIG. 1 illustrates a computing device 100 for synchronizing operations of a sensor module 106 with operations of a NFC module 108 using a two-wire synchronization protocol between a sensor controller 110 and an NFC controller 112 according to an embodiment. The computing device 100 may be any type of computing device such as a laptop computer, smartphone, tablet, or desktop computer, etc. The computing device 100 may include at least one processor 126 and a non-transitory computer readable medium 128 that stores instructions executable by the at least one processor 126 for performing the functionalities/operations of the computing device 100 as discussed herein. The at least one processor 126 may include one or more circuits or devices attached to a semiconductor substrate(s).

The sensor controller 110 may be configured to control the operations of the sensor module 106. The sensor module 106 may be any type of user-input sensor device configured to sense the presence and/or movement of a user to control operations of the computing device 100. In some examples, the sensor module 106 may be a trackpad module or a touch pad module. In some examples, the sensor module 106 may include a surface and a printed circuit board (PCB) having one or more layers.

In some examples, the sensor module 106 may perform sensor scans 118 such as capacitive sensing scans. The sensor module 106 may be configured to periodically perform the sensor scans 118 in order to detect any touch signals 120 (e.g., tactile user input) within a sensor active area 102. During each sensor scan 118, the sensor module 106 may be configured to detect touch from the user based on capacitive-sensing units (e.g. detecting capacitive changes within capacitive elements in one of the PCB layers). In one example, a user can slide or move one or more figures across the surface of the sensor module 106 to move a cursor visible on a display of the computing device 100. More generally, during each sensor scan 118, the sensor module 106 can detect capacitive changes caused by a user's finger touching, tapping, or sliding over the surface of the sensor module 106. Accordingly, the sensor module 106 can detect the signal reflecting the changes in capacitance as the touch signal 120. Also, the sensor module 106 may continue to perform the sensor scans 118 as long as it continues to receive the touch signals 120.

The computing device 100 may include a sensor internal timer 114 associated with the sensor controller 110. The sensor internal timer 114 provides the timing information for instituting the sensor scans 118. As such, the sensor controller 110 may periodically receive a start sensor scan signal from the sensor internal timer 114 to indicate when to perform the sensor scans 118, and the sensor controller 110 may control the sensor module 106 to carry out the sensor scans 118 according to the start sensor scan signal(s). In some examples, the sensor internal timer 114 may be configured to periodically expire, time-out, or trigger, which prompts the sensor controller 110 to initiate a sensor scan 118 with the sensor module 106.

The NFC controller 112 may be configured to control the operations of the NFC module 108. The NFC module 108 may be any type of near-field communication device that is configured to detect presence of another NFC-equipped device and then wirelessly exchange information with the NFC-equipped device according to standard NFC protocols. In some examples, the NFC module 108 may include an antenna (e.g., coiled antenna structure generating a magnetic field) configured to transmit and receive signals using NFC protocols. Generally, NFC requires that NFC devices be present within a relatively small distance from one another so that information can be exchanged between the devices via magnetic induction between respective loop antennae located in an NFC active area 104 of each device. For example, the NFC module 108 may transmit or generate a magnetic field modulated with information. This magnetic field inductively couples into a secondary NFC device that is proximate to the NFC active area 104 of the NFC module 108 of the first device. The secondary NFC device may respond to the NFC module 108 by transmitting or generating its own modulated magnetic field and inductively coupling this magnetic field to the NFC module 108 via the NFC active area 104.

In particular, the NFC module 108 may be configured to perform NFC scans 122 (also referred to as polling) to detect the presence of another NFC-equipped device. For example, during each NFC scan 122, the NFC module 108 may be configured to generate a magnetic field via its antenna and probe the magnetic field of another NFC-equipped device. The NFC module 108 may be configured to generate the magnetic field for a certain time interval. If another NFC-equipped device is detected during one of the NFC scans 122, the NFC module 108 may be configured to perform NFC communication 124 with the NFC-equipped device such as the transfer of NFC signals according to standard NFC protocols.

The computing device 100 may include an NFC internal timer 116 associated with the NFC controller 112. The NFC internal timer 116 may provide the timing information for instituting the NFC scans 122. The NFC controller 112 may periodically receive a start NFC scan signal from the NFC internal timer 116, and the NFC controller 112 may control the NFC module 108 to carry out the NFC scans 122 according to the start NFC scan signal(s). In some examples, the NFC internal timer 116 may be configured to periodically expire, time-out, or trigger, which prompts the NFC controller 112 to initiate an NFC scan 122 with the NFC module 108.

In some examples, the sensor active area 102 of the sensor module 106 may at least partially overlap with the NFC active area 104 of the NFC module 108 such that the operation of the NFC module 108 may affect performance of the sensor module 106 (and vice versa). In some examples, the physical components of the sensor module 106 and the NFC module 108 may at least partially overlap within the same or different planes of the computing device 100. In other examples, the physical components of the sensor module 106 and the NFC module 108 may be non-overlapping but proximate to each other such that their wireless operations may interfere with one or another. In some examples, the sensor active area 102 may be the space which wireless signals corresponding to the sensor module 106 propagate, and the NFC active area 104 may be the space which wireless signals corresponding to the NFC module 108 propagate.

In some examples, the sensor module 106 may be integrated with the NFC module 108 such that input for both of these components may be received within a same unified area (overlapping area) on the computing device 100. In some examples, the overlapping area may be the entire sensor module 106 (e.g., entire trackpad). In other examples, the overlapping area may be a portion of the computing device 100 that corresponding to the overlapping active areas of the sensor module 106 and the NFC module 108. In some examples, the antenna of the NFC module 108 may be integrated with the PCB of the sensor module 106 (e.g., a wire may partially or fully surround the PCB of the sensor module 106). In one specific example, the sensor scans 118 performed by the sensor module 106 may have a frequency between 100 kHz and 150 kHz. In some examples, the sensor module 106 may scan an entire area of the sensor module 106 in one or two milliseconds, and these sensor scans 118 may interfere with the NFC scans 122 and/or the NFC communication 124.

However, according to the embodiments, the synchronization protocol discussed herein may allow the NFC module 108 and the sensor module 106 to coexist in a manner that does not degrade performance, especially when the sensor active area 102 overlaps with the NFC active area 104 thereby providing at least a portion of the computing device 100 as an interaction point for the user for both the NFC module 108 and the sensor module 106. According to the embodiments, the sensor controller 110 may be connected to the NFC controller 112 via a first communication line 113-1 and a second communication line 113-2 such that control signals are transferred between the sensor controller and the NFC controller 112 to synchronize the operations of the sensor module 106 and the operations of the NFC module 108. The first and second communication lines 113 may be any type of communication channel that can transfer electrical signals between two components. In some examples, the first and second communication lines 113 may be conductive (e.g., metal) wires connected to the sensor controller 110 and the NFC controller 112.

In some examples, the sensor controller 110 and the NFC controller 112 may synchronize its operations according to two control signals—active control signal (output) and a non-allowability control signal (input)—which are transferred between the sensor controller 110 and the NFC controller 112 via the first communication line 113-1 and the second communication line 113-2. In some examples, the active control signal and the non-allowability control signal may be level-sensitive signals. For instance, the active control signal may have a high state and a low state, and the non-allowability control signal may have a high state and a low state. In some examples, the assertion (or activation) of the active control signal may be the transition from the low state to the high state, and the assertion (or activation) of the non-allowability control signal may be the transition from the low state to the high state. In other examples, the assertion of the active control signal and/or the non-allowability control signal may be the transition from the high state to the low state. In some examples, the sensor controller 110 and the NFC controller 112 are configured to communicate with each other via the first and second communication lines 113 according to a symmetric synchronization protocol. For example, the NFC controller 112 follows the same synchronization protocol as the sensor controller 110 (and vice versa).

Synchronization Protocol for Sensor Controller 110

When it comes time to scan (e.g., as prompted by the sensor internal timer 114), the sensor controller 110 may be configured to output an active sensor control signal on the first communication line 113-1 (e.g., thereby driving its active sensor control signal high or low on the first communication line 113-1) if the sensor controller 110 is allowed to start a sensor scan 118. In some examples, the sensor controller 110 may drive (e.g., activate or assert) the active sensor control signal on the first communication line 113-1 to the high state whenever the sensor module 106 is active (e.g., a sensor scan 118 is in progress or the sensor module 106 is currently processing touch signals 120). It is noted that the sensor controller 110 may alternatively drive the active sensor control signal to the low state whenever the sensor module 106 is active and all references to the high state of any active control signal as being the activation state is merely used for explanatory purposes only.

In some examples, the sensor controller 110 may drive the active sensor control signal on the first communication line 113-1 before starting the sensor scan 118 and de-assert the active sensor control signal on the first communication line 113-1 after the sensor module 106 is inactive. It is noted that the sensor controller 110 may continuously assert the active sensor control signal while the sensor module 106 is active, e.g., until completion of the sensor scan 118 or after the sensor module 106 finishing processing the touch signals 120, whichever is later. In this manner, the synchronization protocol may allow the sensor module's full bandwidth to carry out its operations (e.g., until it has sensed that the user's finger has left the surface).

In some examples, the sensor controller 110 is allowed to start the sensor scan 118 if the sensor controller 110 does not detect or receive a non-allowability control signal on the second communication line 113-2. For instance, the sensor controller 110 may identify this non-allowability control signal on the second communication line 113-2 when the NFC controller 112 is active (e.g., when the NFC controller 112 asserts its active NFC control signal on the second communication line 113-2). In some examples, the sensor controller 110 is prevented from starting the sensor scan 118 while the sensor's non-allowability control signal is driven high, and the sensor scan 118 may be resumed when the timer of the sensor internal timer 114 expires (e.g., issues a start sensor scan signal) or the sensor's non-allowability control signal is driven low, whichever is later. Also, the sensor's non-allowability control signal may be continuously driven high while the NFC module 108 is active.

Furthermore, if the sensor's non-allowability control signal is driven high while the sensor controller 110 is asserting its active sensor control signal (e.g., the sensor module 106 is in use or active), the sensor controller 110 may be configured to disregard the non-allowability control signal until the sensor module 106 is inactive. For example, in this case, the sensor controller 110 may continuously drive the active sensor control signal on the first communication line 113-1 until the sensor module's transactions are completed.

From the perspective of the NFC controller 112, while the sensor module 106 is active, the NFC controller 112 may receive and identify the sensor controller's active sensor control signal on the first communication line 113-1 as an indicator to potentially delay an NFC scan 122. For instance, the NFC controller 112 may view the sensor controller's active sensor control signal as the NFC's non-allowability control signal. As further explained below, when it comes time to scan (e.g., as indicated by the NFC internal timer 116), the NFC controller 112 may determine if the sensor controller's active sensor control signal is on the first communication line 113-1 (stated another way, if the non-allowability control signal is on the first communication line 113-1), and then delay the NFC scan 122 until the sensor module 106 is inactive.

Synchronization Protocol for NFC Controller 112

With respect to the other half of the synchronization protocol, it is noted that the NFC controller 112 may operate according to the same protocol as explained above. For example, when it comes time to scan (e.g., as prompted by the NFC internal timer 116), the NFC controller 112 may be configured to output an active NFC control signal on the second communication line 113-2 (e.g., thereby driving a signal high or low on the second communication line 113-2) if the NFC controller 112 is allowed to start an NFC scan 122.

In some examples, the NFC controller 112 may drive (e.g., activate or assert) the active NFC control signal on the second communication line 113-2 to the high state whenever the NFC module 108 is active (e.g., an NFC scan 122 is in progress or the NFC module 108 is performing the NFC communication 124). In some examples, the NFC controller 112 may drive the active NFC control signal on the second communication line 113-2 before starting the NFC scan 122 and de-assert the active NFC control signal on the second communication line 113-2 after the NFC module 108 is inactive. It is noted that the NFC controller 112 may continuously assert the active NFC control signal while the NFC module 108 is active, e.g., until completion of the NFC scan 122 or after the NFC module 108 finished with the NFC communication 124, whichever is later. In this manner, the synchronization protocol may allow the NFC module's full bandwidth to carry out its operations.

The NFC controller 112 is allowed to start the NFC scan 122 if the NFC controller 112 does not receive or detect the NFC's non-allowability control signal on the first communication line 113-1. For instance, the NFC controller 112 may identify the NFC's non-allowability control signal on the first communication line 113-1 when the sensor module 106 is active (e.g., when the sensor controller 110 asserts its active sensor control signal on the first communication line 113-1). In some examples, the NFC controller 112 is prevented from starting the NFC scan 122 while the NFC's non-allowability control signal is driven high, and the NFC scan 122 may be resumed when the timer of the NFC internal timer 116 expires (e.g., issues a start NFC scan signal) or the NFC's non-allowability control signal is driven low, whichever is later. Also, the NFC's non-allowability control signal is continuously driven high while the sensor module 106 is active.

Furthermore, if the NFC's non-allowability control signal is driven high while the NFC controller 112 is asserting its active NFC control signal (e.g., the NFC module 108 is in use or active), the NFC controller 112 may be configured to disregard the NFC's non-allowability control signal until the NFC module 108 is inactive. For example, in this case, the NFC controller 112 may continuously drive the active NFC control signal on the second communication line 113-2 until the NFC module's transactions are completed.

With respect to the synchronization protocol for both the sensor controller 110 and the NFC controller 112, the synchronization protocol may not require acknowledgement messages (e.g., when the controller claims use of its module). For example, the sensor controller 110 and the NFC controller 112 do not transmit acknowledgment signals or messages via the communication lines 113 to acknowledge receipt of an active control signal or a non-allowability control signal. As such, the synchronization protocol may allow some rare collisions (e.g., when both modules are active), however any resulting interference may be negligible and/or not may be perceived by the user of the computing device.

In some examples, the synchronization protocol may take advantage of each controller's internal timing such that external logic is avoided for implementing this synchronization protocol. For example, the scanning operations of the NFC module 108 may be determined according to the NFC internal timer 116, and the scanning operations of the sensor module 106 may be determined according to the sensor internal timer 114. Each internal timer (114 or 116) may indicate when to perform a respective scanning operation. As such, if the NFC controller 112 or the sensor controller 110 has a relatively low power policy (e.g., scans less frequently), the synchronization protocol will not force either the sensor module 106 or the NFC module 108 to perform a scanning operation at a different/additional time than what originally provided by its internal timer.

Figure 2:
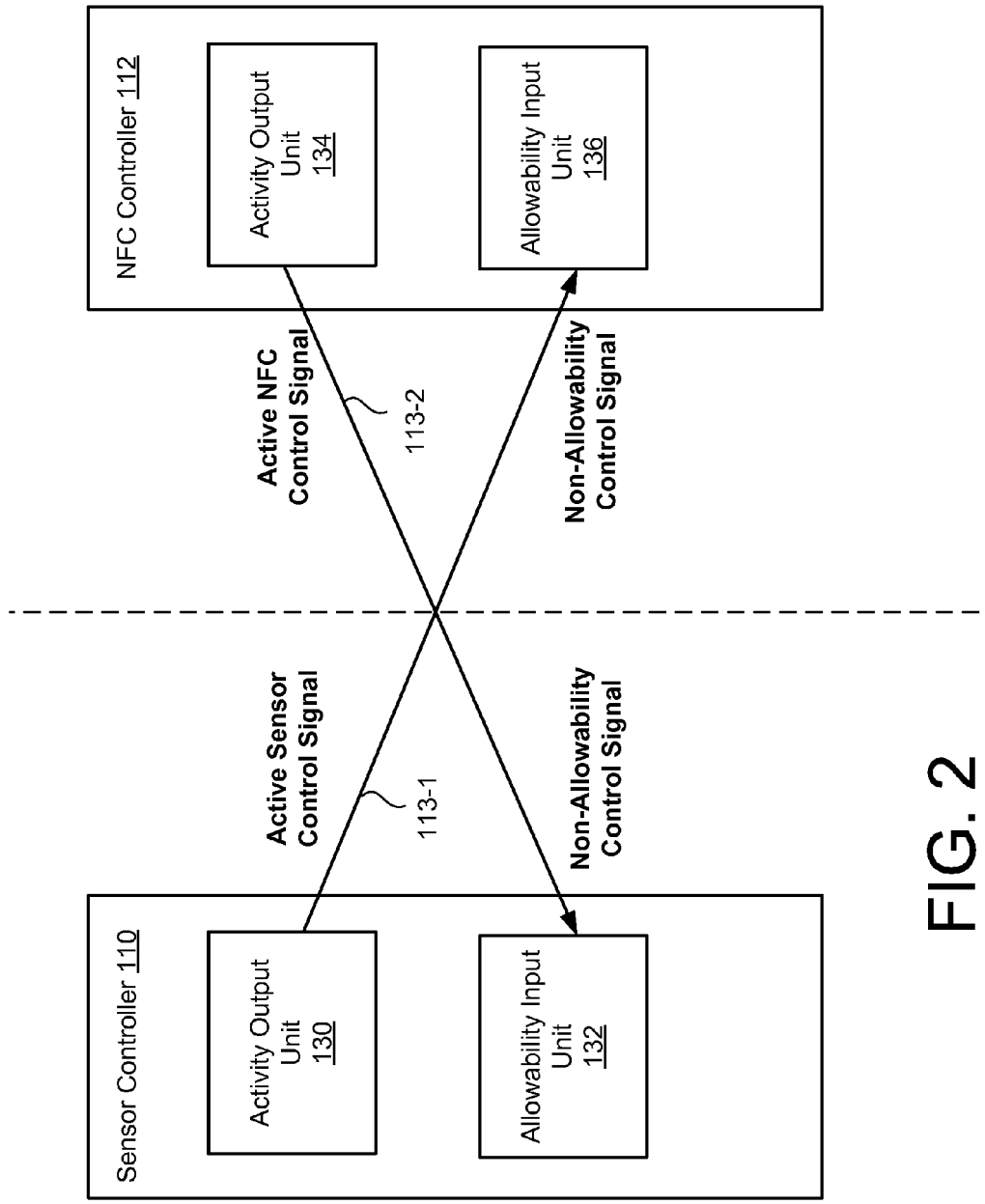
FIG. 2 illustrates an example of the sensor controller being connected to the NFC controller via the two-wire synchronization protocol according to an embodiment.

In some examples, the sensor controller 110 may be considered cross-connected with the NFC controller 112, as discussed with reference to FIG. 2. FIG. 2 illustrates an example of the sensor controller 110 being connected to the NFC controller 112 via the two-wire synchronization protocol according to an embodiment. Referring to FIG. 2, the sensor controller 110 may be connected to the NFC controller 112 via the first communication line 113-1 and the second communication line 113-2 such that the active control signals and the non-allowability control signals are cross-connected.

In some examples, the sensor controller 110 may include an activity output unit 130 configured to output (activate, or assert) the active sensor control signal, and an allowability input unit 132 configured to receive (or detect) the sensor's non-allowability control signal. The NFC controller 112 may include an activity output unit 134 configured to output (activate or assert) the active NFC control signal, and an allowability input unit 136 configured to receive (or detect) the NFC's non-allowability control signal. As shown in FIG. 2, the activity output unit 130 of the sensor controller 110 may be connected to the allowability input unit 136 of the NFC controller 112 via the first communication line 113-1. The activity output unit 134 of the NFC controller 112 may be connected to the allowability input unit 132 of the sensor controller 110 via the second communication line 113-2.

When it comes time to scan (e.g., as prompted by the sensor internal timer 114), the activity output unit 130 of the sensor controller 110 may be configured to output the active sensor control signal on the first communication line 113-1 if the sensor controller 110 is allowed to start the sensor scan 118. In some examples, the activity output unit 130 of the sensor controller 110 may drive the active sensor control signal on the first communication line 113-1 to the high state whenever the sensor module 106 is active. In some examples, the activity output unit 130 of the sensor controller 110 may drive the active sensor control signal on the first communication line 113-1 before starting the sensor scan 118 and de-assert the active sensor control signal on the first communication line 113-1 after the sensor module 106 is inactive.

In order to determine whether the sensor controller 110 is allowed to start the sensor scan 118, the allowability input unit 132 of the sensor controller 110 is configured to determine whether the sensor's non-allowability control signal is asserted on the second communication line 113-2. For instance, the allowability input unit 132 of the sensor controller 110 may identify the sensor's non-allowability control signal on the second communication line 113-2 when the NFC module 108 is active. Stated another way, the allowability input unit 132 of the sensor controller 110 may view of an asserted active NFC control signal as an activation of the sensor's non-allowability control signal on the second communication line 113-2—meaning that the sensor module 106 is not permitted to be active. In some examples, the sensor controller 110 is prevented from starting the sensor scan 118 while the sensor's non-allowability control signal is driven high, and the sensor scan 118 may be resumed when the timer of the sensor internal timer 114 expires or the sensor's non-allowability control signal is driven low, whichever is later.

Similarly, when it comes time to scan (as prompted by the NFC internal timer 116), the activity output unit 134 of the NFC controller 112 may be configured to output the active NFC control signal on the second communication line 113-2 if the NFC controller 112 is allowed to start an NFC scan 122. In some examples, the activity output unit 134 of the NFC controller 112 may drive (e.g., activate or assert) the active NFC control signal on the second communication line 113-2 to the high state whenever the NFC module 108 is active. In some examples, the activity output unit 134 of the NFC controller 112 may drive the active NFC control signal on the second communication line 113-2 before starting the NFC scan 122 and de-assert the active NFC control signal on the second communication line 113-2 after the NFC module 108 is inactive.

In order to determine whether the NFC controller 112 is allowed to start the NFC scan 122, the allowability input unit 136 of the NFC controller 112 is configured to determine whether the NFC's non-allowability control signal is asserted on the first communication line 113-1. For instance, the allowability input unit 136 of the NFC controller 112 may identify the NFC's non-allowability control signal on the first communication line 113-1 when the sensor module 106 is active. In some examples, the NFC controller 112 is prevented from starting the NFC scan 122 while the NFC's non-allowability control signal is driven high, and the NFC scan 122 may be resumed when the timer of the NFC internal timer 116 expires or the NFC's non-allowability control signal is driven low, whichever is later.

Figure 3:
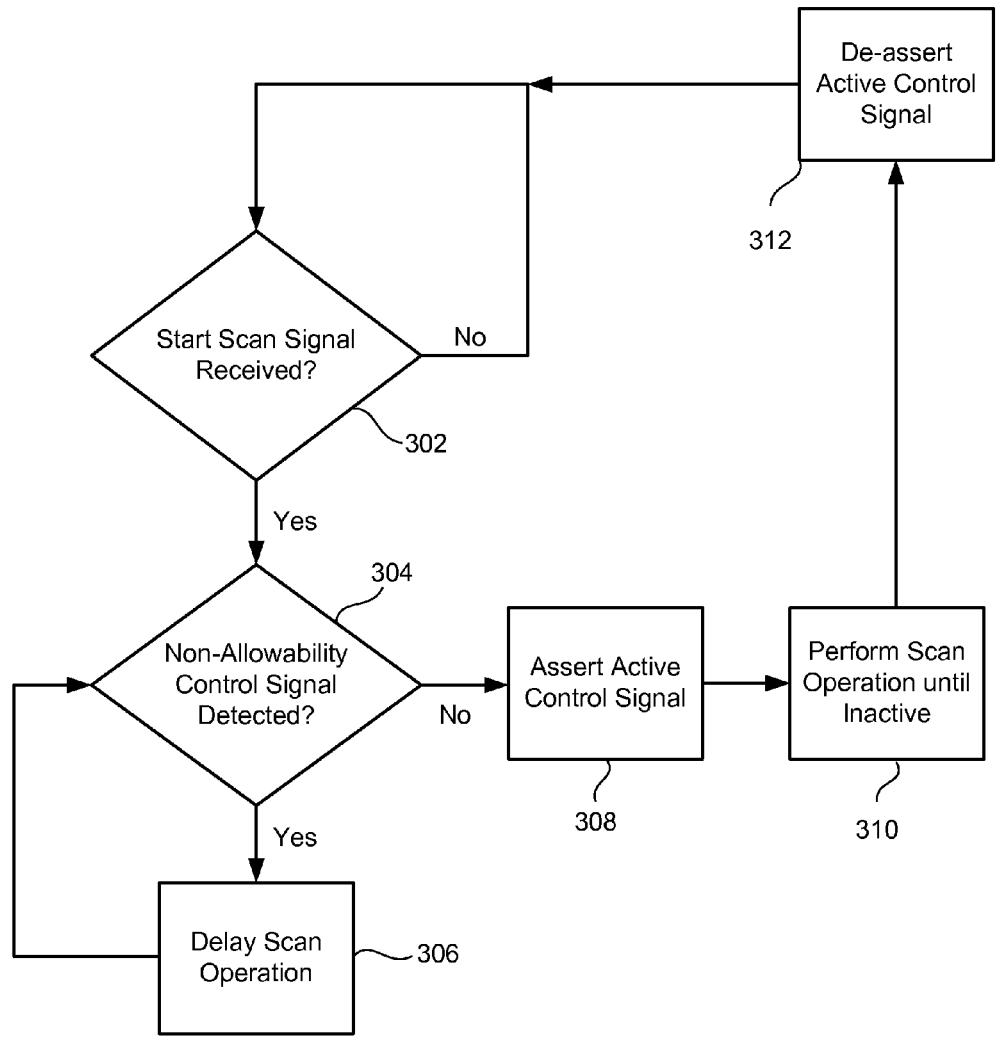
FIG. 3 illustrates a flowchart depicting example operations of the synchronization protocol performed by the sensor controller or the NFC controller of FIGS. 1 and 2 according to an embodiment.

FIG. 3 illustrates a flowchart depicting example operations of the synchronization protocol performed by a controller according to an embodiment. Although the flowchart of FIG. 3 illustrates the operations in sequential order, this is merely an example, and additional or alternative operations may be included. Further, the example operations of FIG. 3 and related operations may be executed in a different order than that shown, or in a parallel or overlapping fashion. The controller discussed with reference to FIG. 3 may be either the sensor controller 110 or the NFC controller 112 of FIGS. 1 and 2, and the module discussed with reference to FIG. 3 may be the sensor module 106 or the NFC module 108 of FIG. 1.

A start scan signal is determined as received (302). For example, the controller may wait for initiation of a start scan signal from its corresponding internal timer. As indicated above, the scanning operations of a respective device may be controlled by its own internal timer. As such, the controller may wait to initiate a scan operation until prompted by its internal timer.

Once the start scan signal is determine as received (Yes), it is determined whether a non-allowability control signal is detected. For example, the controller may determine whether it has detected or received the non-allowability control signal via one of the communication lines 113. The state of the non-allowability control signal may correspond to whether or not the other controller's active control signal has been asserted, as discussed with reference to FIGS. 1-2.

If the non-allowability control signal is detected (Yes), the scan operation may be delayed (306). For example, the controller may delay the scheduled scan operation until the non-allowability control signal is detected as de-activated. If the non-allowability control signal is not detected (No), the active control signal may be asserted (308). For example, the controller may be configured to assert its active control signal on the other communication line 113 of the two-wire communication line 113. Next, a scan operation is performed until the module is inactive (310). For example, the controller is configured to instruct its corresponding module to perform its respective scan operation. The controller may be configured to continuously assert the active control signal while the module is active. After the module is determined as inactive, the active control signal is de-asserted (312). For example, the controller is configured to de-assert the active control signal on one of the communication lines 113.

Figure 4:
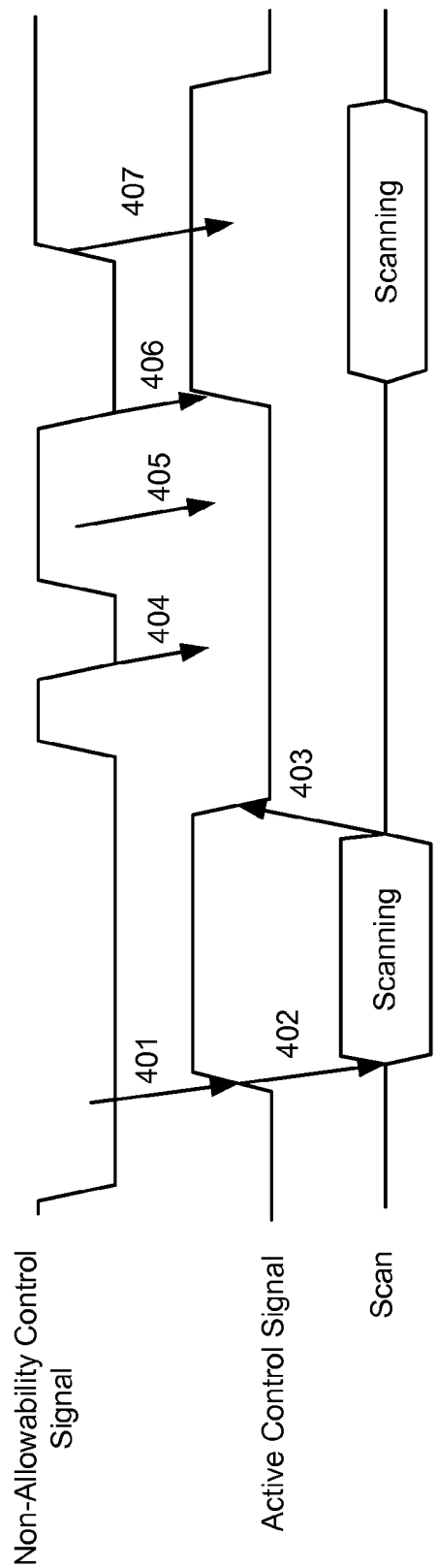
FIG. 4 illustrates example waveforms of an active control signal and a non-allowability control signal produced by the sensor controller or the NFC controller of FIGS. 1-3 according to an embodiment.

FIG. 4 illustrates example waveforms of the active control signal and the non-allowability control signal produced by the sensor controller 110 or the NFC controller 112 of FIGS. 1-2 according to an embodiment. The operations discussed with reference to FIG. 4 may apply to a controller such as the sensor controller 110 or the NFC controller 112 of FIGS. 1-2. As shown in FIG. 4, each of the active control signal and the non-allowability control signal includes two level-sensitive states—high state and low state. In some examples (as shown in FIG. 4), the high state of the non-allowability control signal indicates that the non-allowability control signal is asserted or activated, and the high state of the active control signal indicates that the active control signal is asserted or activated.

As indicated above, scanning (or polling) is not permitted while its corresponding non-allowability control signal is activated, and the scanning (or polling) resumes when its corresponding internal timer has expired or the non-allowability control signal is de-activated. Also, the non-allowability control signal may remain in the activated state while the co-existing module is in active use. The active control signal may be activated whenever the corresponding module is active, e.g., the active control signal is activated before the scan operation begins and is de-activated after the corresponding module is de-active. Generally, the non-allowability control signal is not activated while the active control signal is activated, but if it does, the non-allowability control signal is ignored or disregarded for the duration of the scan operation. In addition, the active control signal may remain in the activated state until all transactions (operations) associated with its module are completed.

Referring to FIG. 4, at point 401, because the non-allowability control signal has the low state, scanning operations may be permitted. Next, the controller may assert the active control signal on one of the communication lines 113 by transitioning the active control signal from the low state to the high state. For example, the controller may determine it is time to initiate a scanning operation (e.g., based on its internal timer) and determine that it permitted is start the scanning operation based on the non-allowability control signal being in the low state. In order to begin the scanning operation, the controller may activate the active control signal by transitioning the active control signal from the low state to the high state. At point 402, the module performs the scanning operating after the controller asserts the active control signal. At point 403, the module has completed the scanning operation (and is also inactive), and therefore the controller may de-assert the active control signal by transitioning the active control signal from the high state to the how state. At point 404, the controller receives an indication that the non-allowability control signal is de-asserted (e.g., transitions to the low-state), but since the controller has not been prompted by its internal timing to start another scan, the controller does not initiate a subsequent scanning operation.

At point 405, the controller receives a start scan signal from its internal timer, but the controller determines that the non-allowability control signal is asserted (e.g., in the high-state), and therefore delays the scanning operation. At point 406, the controller receives an indication that the non-allowability control signal is de-asserted (e.g., transitions to the low state), and therefore asserts its active control signal and controls its module to start the scanning operation. At point 407, the controller receives an indication that the non-allowability control signal is re-asserted (e.g., transitions to high state). However, because the module is currently active (e.g., active control signal is still being asserted), the controller may disregard the asserted non-allowability control signal until the module is currently inactive.

Figure 5:
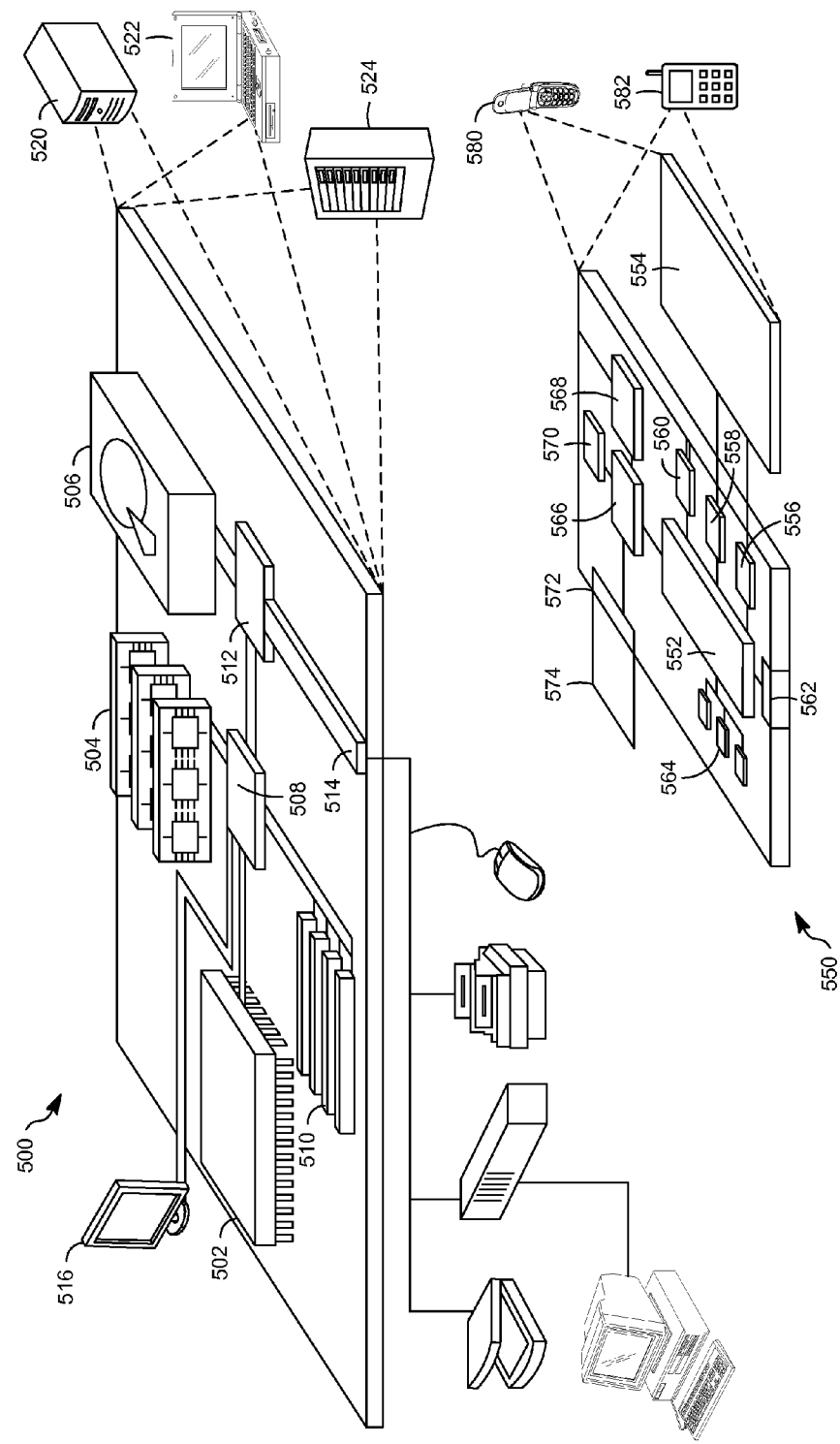
FIG. 5 is a block diagram showing example or representative computing devices and associated elements that may be used to implement the computing devices and operations of FIGS. 1-4.

FIG. 5 is a block diagram showing example or representative computing devices and associated elements that may be used to implement the computing devices and operations of FIGS. 1-4. FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system). In some examples, the processor 502 may be one or more micro-processors. In some examples, the processor 502 may be one or more devices, circuits, or logic disposed on a semiconductor substrate.

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550. In some examples, the processor 552 may be one or more devices, circuits, or logic disposed on a semiconductor substrate.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning system) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing", "asserting", "de-asserting", or "controlling" or "outputting" or "receiving" or "determining" or "providing" or the like, refer to the action and processes of a computer system, or similar electronic computing device, that manipulates and transforms data represented as physical (electronic) quantities within the computer system memories or registers or other such information storage, transmission or display devices.

What is claimed is:

1. A method for synchronizing operations of sensors on a computing device according to a synchronization protocol, the method comprising:

determining, by a first controller configured to control a human-touch capacitive sensor, whether a non-allowability control signal is detected via a first communication line connected between the first controller and a second controller configured to control a short-range wireless communication sensor;

delaying, by the first controller, a start of a scan operation of the human-touch capacitive sensor when the non-allowability control signal is detected on the first communication line;

asserting, by the first controller, an active control signal via a second communication line connected between the first controller and the second controller when the non-allowability control signal is not detected on the first communication line;

performing, by the human-touch capacitive sensor, the scan operation such that the active control signal is asserted by the first controller until operations of the human-touch capacitive sensor are completed; and detecting, by the first controller, the non-allowability control signal on the first communication line but disregarding the non-allowability control signal when the human-touch capacitive sensor is currently active such that the active control signal is continuously driven until the operations of the human-touch capacitive sensor are completed.

2. The method of claim 1, further comprising:

de-asserting, by the first controller, the active control signal, after the operations of the human-touch capacitive sensor are completed.

3. The method of claim 1, wherein an active area of the human-touch capacitive sensor at least partially overlaps with an active area of the short-range wireless communication sensor such that a portion of the computing device functions as an interaction point for both the human-touch capacitive sensor and the short-range wireless communication sensor.

4. The method of claim 1, further comprising:

determining, by the first controller, whether a start scan signal is detected, wherein the first controller determines whether the non-allowability control signal is asserted when the start scan signal is determined as detected.

5. The method of claim 1, wherein the synchronization protocol does not force the human-touch capacitive sensor to start performance of the scan operation at a different time than what originally provided by an internal timer of the human touch capacitive sensor.

6. A computing device comprising:

a first controller configured to control operations of a human-touch capacitive sensor;

a second controller configured to control operations of a short-range wireless communication sensor; and a plurality of communication lines including a first communication line and a second communication lines, each of the first and second communication lines being connected to the first controller and the second controller such that control signals are transferred between the first controller and the second controller to synchronize the operations of the human-touch capacitive sensor and the operations of the short-range wireless communication sensor, wherein the first controller is configured to assert an active sensor control signal on the first communication line and control the human-touch capacitive sensor to start a sensor scan to determine whether any touch signals exist within an active area of the human-touch capacitive sensor when an active control signal is not asserted by the second controller on the second communication line, wherein the first controller is configured to drive the active sensor control signal until the sensor scan is complete, wherein the second controller is configured to assert the active control signal on the second communication line and control the short-range wireless communication sensor to start a scan when the active sensor control signal is not asserted by the first controller on the first communication line.

7. The computing device of claim 6, wherein the first controller is configured to control the human-touch capacitive sensor to delay the start of the sensor scan until the first controller does not detect the active control signal on the second communication line.

8. The computing device of claim 6, wherein the second controller is configured to de-assert the active control signal after the operations of the short-range wireless communication sensor are completed, and the first controller is configured to de-assert the active sensor control signal after the sensor scan is complete or after a last touch signal is processed, whichever is later.

9. The computing device of claim 6, wherein the first controller includes a sensor internal timer configured to determine a timing of the sensor scan, and the human-touch capacitive sensor is not forced to perform the sensor scan at a different time than what is originally provided by the sensor internal timer.

10. The computing device of claim 9, wherein the second controller includes an internal timer configured to determining a timing of the scan, and the short-range wireless communication sensor is not forced to perform the scan at a different time than what is originally provided by the internal timer of the second controller.

11. The computing device of claim 6, wherein the active area of the human-touch capacitive sensor at least partially overlaps with an active area of the short-range wireless communication sensor such that a portion of the computing device functions as an interaction point for both the human-touch capacitive sensor and the short-range wireless communication sensor.

12. The computing device of claim 6, wherein the interaction point for both the human-touch capacitive sensor and the short-range wireless communication sensor is a trackpad, and an antenna of the short-range wireless communication sensor is integrated within a printed circuit board (PCB) portion of the human-touch capacitive sensor.

* * * * *